(No Model.)

E. S. HOLLISTER.
POLISHING MACHINE.

No. 344,835. Patented July 6, 1886.

WITNESSES:
M. S. Seeley
C. L. Swan Jr.

INVENTOR
Elisha S. Hollister
BY Geo. D. Seymour
ATTORNEY

UNITED STATES PATENT OFFICE.

ELISHA S. HOLLISTER, OF BRISTOL, CONNECTICUT.

POLISHING-MACHINE.

SPECIFICATION forming part of Letters Patent No. 344,835, dated July 6, 1886.

Application filed June 13, 1885. Serial No. 168,629. (No model.)

*To all whom it may concern:*

Be it known that I, ELISHA S. HOLLISTER, residing at Bristol, in the county of New Haven and State of Connecticut, have invented certain new and useful Improvements in Polishing-Machines; and I do declare the following to be a full, clear, and exact description of the same, reference being had to the accompanying drawings, which form a part of this specification.

My invention relates to an improvement in that class of polishing-machines in which the work is done upon a belt, the object being to provide for keeping the belt in line for controlling its tension, and for replacing those parts of the machine most exposed to wear.

With these ends in view my invention consists in bearings for the opposite ends of the pulley carrying the polishing-belt, each of the said bearings being independently adjustable in lines parallel with the same.

My invention further consists in bearings for the opposite ends of the pulley carrying the polishing-belt, each of said bearings being independently adjustable in lines parallel with the same, in combination with an adjustable carriage carrying the said bearings.

My invention further consists in certain details of construction and combinations of parts, as will be hereinafter described, and pointed out in the claims.

Figure 1:
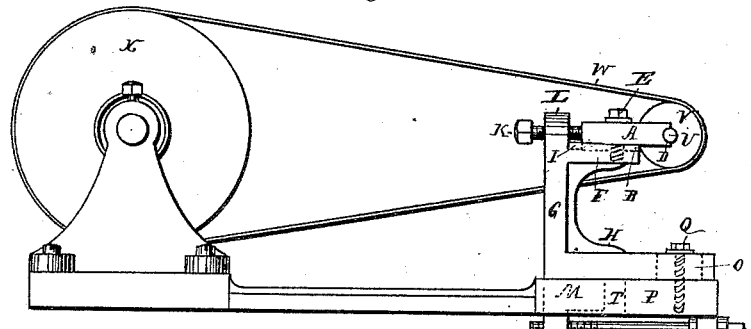
Figure 2:
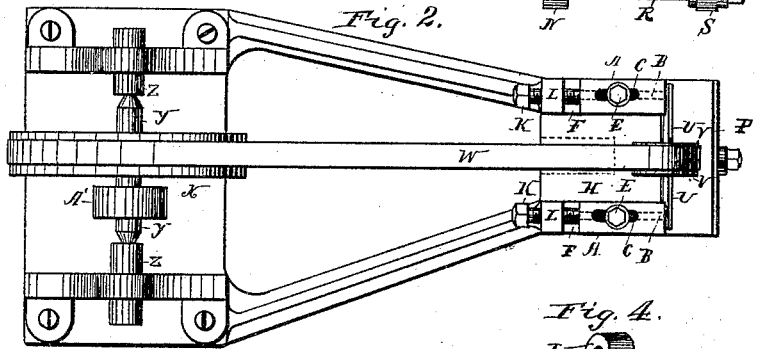
Figure 3:
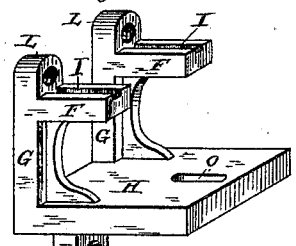
Figure 4:
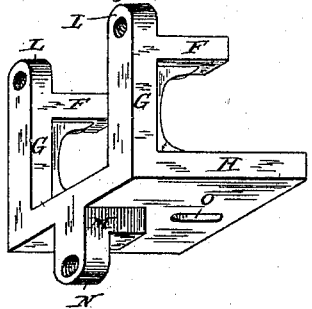
Figure 5:
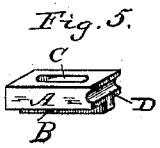

In the accompanying drawings, Figure 1 is a view in side elevation of a machine embodying my invention. Fig. 2 is a plan view thereof. Fig. 3 is a detached view in perspective of the adjustable carriage. Fig. 4 is a similar under side view of the same; and Fig. 5 is a detached view in perspective of one of the adjustable bearings of the carrying-pulley.

As herein shown the machine is provided with two independent bearings, A A, each having a shoulder, B, an elongated slot, C, and an open groove, D, and respectively secured by set-screws E E upon beds F F, offsetting from the arms G G of a suitable carriage, H, and each provided with a groove, I, to receive the shoulder B of the bearing mounted upon it. Set-screws K K, mounted in lugs L L, formed upon the arms G G aforesaid, impinge against the rear ends of the bearings and afford means for longitudinally adjusting them. The carriage H is also provided with a guide, M, a tapped lug, N, and an elongated slot, O, and is secured to the bed P of the machine by a set-screw, Q, passing through the slot aforesaid and entering the bed upon which the carriage is adjusted forward and back by an adjusting-screw, R, located (so as to be operated from the front of the machine) in a lug, S, depending from the bed P thereof, and extending into the tapped lug of the carriage, the same being guided in its adjustment upon the bed and prevented from lateral deflection in either direction by the entrance of its guide M into an elongated slot, T, formed in the bed. The open groove D D, formed in the outer ends of the bearings A A, receive the opposite ends of the shaft U of a small pulley, V, carrying the polishing-belt W, and held in place by the tension of the said belt, which runs between the arms G G of the carriage, and which is driven by a pulley, X, secured to a shaft, Y, mounted in centers Z Z, and provided with a pulley, A', through which power is communicated to the machine.

In using the machine the belt is driven at a very high rate of speed, and the articles to be polished are applied to the same, together with the polishing material, and as the belt is run under high speed and tension, and as the polishing material is thrown by centrifugal action upon the bearings of the small pulley, whereby they are worn and cut away, the belt frequently gets out of line. When this occurs it is trued by adjusting either or both of the said bearings (which are often worn unequally) forward or back, as may be required, by loosening the screws E E, operating the screws K K, and then tightening the former again. The tension of the belt is controlled by adjusting the carriage upon its bed, which is done by loosening the screw Q, operating the adjusting-screw R, and tightening the former again. When worn out, the bearings may be replaced, and for this purpose it is designed to keep them in duplicate. Thus my invention enables the polishing-belt to be kept true, controlled in tension, and the bearings of the small pulley to be replaced when worn out, with manifest advantage to the general efficiency of the machine, and with economy for repair and attention over the machines heretofore employed, in which the bearings being made solid with the carriage, the belt can be trued, and then but imperfectly, only by swiveling the carriage upon its bed, and when the bearings are worn out the carriage must be replaced in its entirety.

I would have it understood that I do not limit myself to the exact details of construction shown herein, but hold myself at liberty to make such changes and alterations as fairly fall within the spirit and scope of my invention.

Having fully described my invention, what I claim as new, and desire to secure by Letters Patent, is—

1. In a polishing-machine, a polishing-belt, a driving and a carrying pulley therefor, and bearings for the opposite ends of the said pulleys, the bearings for one of the pulleys being made independently adjustable in lines parallel with the belt, substantially as set forth.

2. In a polishing-machine, a polishing-belt, a driving and a carrying pulley therefor, and bearings for the opposite ends of the carrying-pulley, each of the said bearings being independently adjustable in lines parallel with the belt, substantially as set forth.

3. In a polishing-machine, a polishing belt, a driving and a carrying pulley therefor, bearings each provided with an elongated slot for the opposite ends of the carrying-pulley, a carriage, set-screws passing through the slots of the bearings and securing them to the said carriage, and adjusting-screws mounted in the carriage for independently adjusting the said bearings in lines parallel with the polishing-belt, substantially as set forth.

4. In a polishing-machine, a polishing-belt and a driving and a carrying pulley therefor, bearings for the opposite ends of the carrying-pulley, each of the said bearings being independently adjustable in lines parallel with the belt, and an adjustable carriage upon which the said bearings are mounted, substantially as set forth.

5. In a polishing-machine, a polishing-belt and a driving and a carrying pulley therefor, bearings for the opposite ends of the carrying-pulley, each of the said bearings being independently adjustable in lines parallel with the belt, a carriage provided with beds for such bearings and constructed and adapted to be secured to and adjusted and guided upon the bed of the machine, and means, substantially as shown, for adjusting the carriage in a line parallel with the belt, substantially as set forth.

6. In a polishing-machine, a polishing-belt, a driving and a carrying pulley therefor, bearings for the opposite ends of the carrying-pulley, each of the said bearings being independently adjustable in lines parallel with the belt, a carriage provided with beds for such bearings, with a guide and with a tapped lug, a bed for the carriage provided with a slot to receive the guide of the carrriage, and with a depending lug, and an adjusting-screw mounted in the said lug of the bed and extending into the tapped lug of the carriage, substantially as set forth.

In testimony whereof I have signed this specification in the presence of two subscribing witnesses.

ELISHA S. HOLLISTER.

Witnesses:
M. S. SEELEY,
C. L. SWAN, Jr.